US 6,916,876 B2
Jul. 12, 2005

(12) United States Patent
Manshausen et al.

(54) POWDERED THICKENER PREPARATIONS BASED ON POLYURETHANE AND THEIR USE FOR THICKENING AQUEOUS SYSTEMS

(75) Inventors: Peter Manshausen, Köln (DE); Frank Sauer, Langenfeld (DE); Thomas Steinhoff, Leverkusen (DE); Jan Mazanek, Köln (DE); Christian Wamprecht, Neuss (DE); Christel Spinger, Leverkusen (DE); Uwe Priesnitz, Solingen (DE); Peter Happe, Solingen (DE)

(73) Assignee: Borchers GmbH, Monheim (DE)

( * ) Notice: Subject to any disclaimer, the term of this patent is extended or adjusted under 35 U.S.C. 154(b) by 73 days.

(21) Appl. No.: 10/091,640

(22) Filed: Mar. 6, 2002

(65) Prior Publication Data

US 2003/0050389 A1 Mar. 13, 2003

(30) Foreign Application Priority Data

Mar. 12, 2001 (DE) .......................................... 10111791

(51) Int. Cl.$^7$ .............................. C08J 3/00; C08K 3/20; C08K 5/21; C08L 75/00; C08L 1/00
(52) U.S. Cl. ..................... 524/590; 524/591; 524/839; 524/840; 524/27; 524/31; 524/35; 524/56; 524/58; 524/211
(58) Field of Search ................................. 524/590, 591, 524/839, 840, 27, 31, 35, 56, 58, 211

(56) References Cited

U.S. PATENT DOCUMENTS

| | | | | |
|---|---|---|---|---|
| 3,362,780 A | | 1/1968 | Kuth et al. ...................... 8/42 |
| 3,896,073 A | * | 7/1975 | Smith ......................... 524/460 |
| 4,079,028 A | | 3/1978 | Emmons et al. ..... 260/29.6 NR |
| 4,155,892 A | | 5/1979 | Emmons et al. ..... 260/29.2 TN |
| 4,436,862 A | | 3/1984 | Tetenbaum et al. ......... 524/445 |
| 4,499,233 A | | 2/1985 | Tetenbaum et al. ......... 524/591 |
| 5,023,309 A | | 6/1991 | Kruse et al. .................. 528/49 |
| 5,913,972 A | * | 6/1999 | Kanou et al. ............ 106/31.87 |

FOREIGN PATENT DOCUMENTS

| | | |
|---|---|---|
| CA | 1341003 | 5/2000 |
| EP | 0 031 777 | 7/1981 |
| EP | 0 495 373 | 8/1994 |

\* cited by examiner

*Primary Examiner*—Patrick D. Niland
(74) *Attorney, Agent, or Firm*—Diderico van Eyl; Jennifer R. Seng

(57) ABSTRACT

The invention relates to a powdered thickener preparation based on polyurethane, which can be incorporated particularly well into water-based paints and lacquers and into other aqueous systems, and to their use as rheological additives for thickening preferably aqueous systems.

8 Claims, No Drawings

POWDERED THICKENER PREPARATIONS BASED ON POLYURETHANE AND THEIR USE FOR THICKENING AQUEOUS SYSTEMS

BACKGROUND OF THE INVENTION

The invention relates to powdered thickener preparations based on polyurethane, which can be incorporated particularly well into water-based paints and lacquers and into other aqueous systems, and to their use as rheological additives for thickening preferably aqueous systems.

Polyurethane-based thickeners for aqueous systems are described in numerous publications (see for example DE-A 1 444 243, DE-A 3 630 319, EP-A-0 031 777, EP-A-0 307 775, EP-A-0 495 373, U.S. Pat. Nos. 4,079,028, 4,155,892, 4,499,233 or 5,023,309).

A common feature of some thickeners from the prior art is the simultaneous presence of (i) hydrophilic segments in a quantity of at least 50 wt. %, (ii) hydrophobic segments in a quantity of no more than 10 wt. % and (iii) urethane groups. "Hydrophilic segments" here means, in particular, polyether chains with at least 5 links, the alkylene oxide units of which contain at least 60 mole % ethylene oxide units. "Hydrophobic segments" here means, in particular, hydrocarbon segments with at least 6 carbon atoms.

These polyurethane thickeners are suitable as auxiliary substances for adjusting rheological properties of aqueous systems such as automotive and industrial lacquers, stucco- and other paints, printing inks and textile dyes, pigment printing pastes, pharmaceutical and cosmetic preparations, plant protection formulations, filler dispersions and others.

Although the known polyurethane thickeners are widely used, they exhibit some disadvantages. Most of the available products are offered as liquid preparations, as a result of which the lacquers and/or paints in which they are applied are diluted. Particularly when a pre-diluted thickener is added, there is a negative effect on the solids content and other properties of the paint. In addition, the accurate metering of liquid thickener preparations, which may be diluted to concentrations <20%, is difficult in many production plants, or is possible only by complex technical means.

Another disadvantage of the liquid thickener formulations, especially at approx. 50% thickener concentration is the large space requirement, not only for the products as supplied but especially for the pre-diluted mixtures (generally 1:9). Additionally, the known polyurethane thickener formulations generally contain solvents and/or emulsifiers, which is disadvantageous for modern, low-VOC coatings and can also can cause risks to the environment when these are released.

Even the known powdered products consisting of 100% thickener are not ideal. They can often be incorporated into lacquers or paints only with difficulty and thus lead to lump formation in the lacquer mixtures. In addition, their thickening effect is often inadequate. The production of solid thickeners can also be difficult, since their ingredients (active substances) are usually waxy at room temperature so that free-flowing powders, having a long shelf life, cannot be produced.

It is an objective of the present invention to develop novel powdered thickeners based on polyurethane, which are powdered, free-flowing and have a long shelf life, can be readily incorporated and lead to lacquers and/or paints with good rheological properties.

This objective has been realized by polyurethane thickener mixed with a support that is solid at room temperature, in such a way that a free-flowing powder is obtained, which can be readily incorporated into paints and/or lacquers and other aqueous systems, imparting excellent rheological properties to them.

SUMMARY OF THE INVENTION

The present invention relates to a powdered thickener preparation produced by forming a solution, suspension or melt of a mixture containing
a) at least one urethane group-containing, water-soluble or water-dispersible thickener,
b) at least one substance solid at room temperature
c) optionally a non-ionic, aromatic or aliphatic emulsifier and
d) optionally other auxiliary substances
and subsequently converting the products obtained into powder form by drying and optionally grinding.

The invention also relates to a process for the production of the powdered thickener preparations according to the invention, by forming a solution, suspension or melt of a mixture comprising
a) at least one urethane group-containing, water-soluble or water-dispersible thickener,
b) at least one substance solid at room temperature
c) optionally a non-ionic, aromatic or aliphatic emulsifier and
d) optionally other auxiliary substances
and subsequently converting the products obtained into powder form by drying and optionally grinding The invention also provides the use of these thickener preparations to adjust the Theological properties of aqueous systems, preferably aqueous automotive and industrial lacquers, stucco- and other paints, printing inks and textile dyes, pigment printing pastes, aqueous pharmaceutical and cosmetic formulations, plant protection formulations, filler and pigment dispersions, preparations of detergents, adhesives, waxes and polishes and for petroleum extraction.

DETAILED DESCRIPTION OF THE INVENTION

Suitable components (a) include polyurethane thickeners of the type that is known per se with hydrophilic and hydrophobic segments and urethane groups.

Suitable components (b) include water-soluble or water-dispersible substances, solid at room temperature, which are inert in relation to the aqueous systems to be thickened. The water-dispersible substances include, in particular, powdered substances with an average particle size of <20 $\mu$m, more preferably <10 $\mu$m. However, coarser materials that are comminuted to the appropriate particle size during the production of the thickener formulations according to the invention can also be used.

Examples of these solid inert substances of component b), which can also be used as mixtures include fillers such as silica flour, chalk, talcum, kaolin, bentonite and other layer-lattice silicates; pigments such as titanium dioxide, iron oxides; sulfates such as barium sulfate; carbonates such as calcium carbonate, magnesium carbonate; organic pigments, and other finely powdered substances such as pyrogenic silica. The above components can also be used in mixtures with one another. Thus, for example, mixtures of barium sulfate, titanium dioxide or talcum can be used as component b).

Suitable components (b) also include for example, at least one water-soluble substance which is solid at room temperature. These can be water-soluble substances having no negative effect on the properties of the aqueous systems. Compounds having a solubility of at least 10 wt. % at room temperature are referred to as water-soluble substances. Compounds having a solubility of 20 wt. % and more are particularly suitable. Examples include inorganic salts with monovalent cations, such as sodium chloride, sodium sulfate, potassium chloride, sodium phosphate, sodium polyphosphate, and also alkali salts of organic acids, such as oxalic acid, succinic acid, citric acid, polyaspartic acid, phosphorobutane tricarboxylic acid, water-soluble alkyd resins, poly(meth)acrylic acid and copolymers, together with other polymers containing carboxyl/sulfonyl groups and mixtures thereof with inorganic salts. Water-soluble, neutral organic compounds are also suitable, e.g. sugars such as sucrose, cellulose, glucose, fructose and other sugar derivatives, urea (derivatives), other water-soluble polymers such as polyethylene oxide, polyvinyl pyrrolidone etc. Mixtures of these substances and mixtures with water-insoluble substances can, of course, also be used.

When selecting a suitable component (b) it should be ensured that it is not changed as a result of the action of an external force, e.g. agitators, but remains inert in relation to the aqueous systems to be thickened. Temperature stability should also be guaranteed under the manufacturing and processing conditions conventionally used.

Suitable components c) preferably include at least one compound of formulae I), II) and III).

Compounds of formula (I)

(I), in which

R represents an optionally substituted aromatic and/or alkylaromatic hydrocarbon residue with 6 to 50 carbon atoms, preferably an aromatic or alkylaromatic hydrocarbon residue with 6 to 40 carbon atoms, optionally comprising several aromatic rings and/or exhibiting inert substituents, Q' represents alkylene oxide units, as formed during the alkoxylation of starter molecules containing hydroxyl groups with $C_2$–$C_4$ alkylene oxides, Q' preferably denoting ethylene oxide and/or propylene oxide units, x represents a number from 1 to 300, preferably 5 to 100 and more preferably 10 to 30 and y represents a number from 1 to 20, preferably 1 to 10 and more preferably 1 to 4, can be used as component c).

Compounds of the general formula II), $R_2$—[$EO_x$—$PO_y$]—H (II), in which $R_2$ represents a linear residue with 6 to 15 hydrocarbon atoms, EO, PO represent ethylene oxide and propylene oxide residues, respectively, x represents a number from 3 to 20 y represents a number from 0 to 6, are used as component c).

The components c) are alkylation products of suitable starter molecules, which are known per se, with ethylene oxide, propylene oxide or the isomeric butylenes oxides being particularly suitable as alkylene oxides. However, the alkylene oxides are preferably ethylene oxide or mixtures of ethylene oxide with propylene oxide. In principle, it is possible to use different alkylene oxides in succession so that different polyether blocks are formed.

Suitable starter molecules are, in particular, mono- and polyfunctional phenols corresponding to the above definition of R, x and y, e.g. phenol and compounds corresponding to the following formulae (IV) and (V).

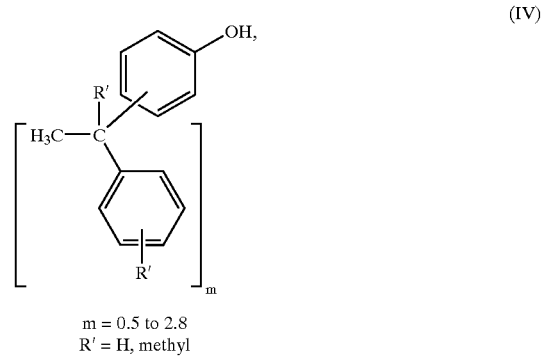

m = 0.5 to 2.8
R' = H, methyl

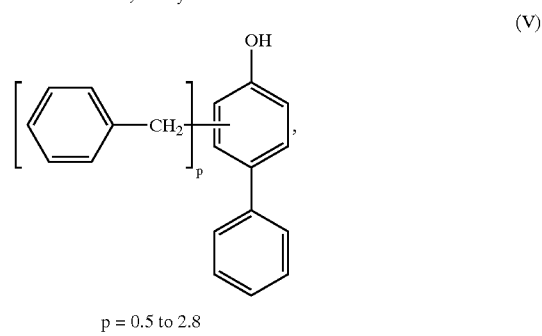

p = 0.5 to 2.8

(m and p are statistical averages)

Compounds of the formula

(III), wherein $R_2$ represents an optionally branched and/or unsaturated aliphatic residue with 6 to 22, preferably 8 to 16, more preferred 8 to 12 carbon atoms, and/or a cycloaliphatic residue with 6 to 10 carbon atoms and/or a heterocyclic residue with 5 to 12, preferably 5 to 7 ring atoms, as formed by separating off the active hydrogen from appropriate alcohols, amines, carboxylic acids and/or amides, $Q_2$ represents alkylene oxide units, as formed during the alkoxylation of starter molecules containing hydroxyl groups with $C_2$–$C_4$ alkylene oxides, with $Q_2$ preferably representing ethylene oxide and/or propylene oxide units, x represents a number from 1 to 30, preferably 2 to 20 and more preferably 4 to 10 and y represents a number from 1 to 10, preferably 1 to 6 and more preferably 1 and 2, are preferably used as component c).

Suitable starter molecules for component c) include: n-hexanol, n-octanol, isooctyl alcohol, n-nonanol, isononanol, n-decanol, isocyanate-undecanol, undecanol, n-dodecanol, tetradecanol, hexadecanol and mixtures thereof, as obtained e.g. in industrial syntheses or from natural products. Other examples are cyclohexanol, methylcyclohexanol, hydroxytetralin, n-hexylamine, n-octylamine, n-dodecylamine, dodecanoamide and caprolactam.

Suitable auxiliary substances (d) that are optionally incorporated include polyhydric alcohols, such as e.g. propylene glycol, optionally in mixtures with water, which can be used for the formulation of the individual components, among other things. Co-solvents, such as N-methylpyrrolidone or solvents/solvent mixtures can also be used.

In the thickener preparations according to the invention, component (a) is present in a quantity of 0.5 to 90, preferably 5 to 70 and more preferably 20 to 60 wt. %, based on the total mixture and component (b) in a quantity of 0.5 to 90, preferably 5 to 60, more preferably 10 to 40 wt. %, based on the total mixture, with the total quantity of components (a) and (b) being at least 80 wt. %, preferably at least 90 wt. %, based on the total mixture.

In addition to these individual components that are essential for the invention, other auxiliary substances (c) and (d) can also be present, as already stated. However, the proportion by weight of these auxiliary substances is no more than 30 wt. %, based on the weight of the total mixture.

The production of the preparations according to the invention can take place in a know manner. Thus, for example, components (a), (b), (c) and (d) can first be converted to an aqueous solution or suspension and converted to preparations according to the invention by known drying processes, e.g. by the spray-drying/fluid-bed drying process. However, the components (a), (b), (c) and (d) can also be intimately mixed in a mixer, optionally at an elevated temperature, and then brought into the form of a powder by comminution or grinding. The mixing of the components according to the invention at an elevated temperature is particularly suitable.

The ready-to-use preparations according to the invention represent free-flowing, solid mixtures, which do not agglomerate even during storage. Their shelf life is generally at least as long as that of a corresponding liquid preparation.

The preparations according to the invention can be added to the aqueous systems to be thickened either at the beginning of, during or after the production process. The possibility of adding the thickeners according to the invention afterwards is particularly advantageous for practical applications.

Another advantage of the preparations according to the invention lies in their compatibility with the aqueous systems to be thickened, e.g. emulsion paints, which enables the thickeners to be readily incorporated, and at the same time the so-called maturing period of the thickened preparations obtained, i.e. the period up to the maximum possible viscosity being achieved, is generally substantially reduced compared with known 100% solid thickeners.

The observation that the thickening action of the preparations according to the invention is not affected, or is only slightly affected, compared with the corresponding liquid formulations is particularly noteworthy.

The preparations according to the invention are suitable for thickening aqueous or predominantly aqueous systems, such as paints, printing and pigment pastes, filler and pigment dispersions, textile, leather and paper auxiliaries, preparation for petroleum extraction, preparations of detergents, adhesives, waxes, for polishes, formulations for pharmaceutical and veterinary purposes, plant protection preparations, cosmetic articles etc. Even water itself can be slightly thickened with the polyurethane thickeners according to the invention so that other additives can then optionally be added to it or it can itself be added to aqueous preparations.

The thickener preparations according to the invention are suitable not only for thickening purely aqueous systems, but also those systems containing proportions of organic solvents or other volatile additives, such as e.g. polyhydric alcohols. The aqueous systems to be thickened can, of course, contain the auxiliary substances and additives conventional in such systems, such as defoamers, flow promoters, fillers, pigments and the like.

Examples of aqueous systems that can be thickened according to the invention are aqueous polyacrylate dispersions, aqueous dispersions of copolymers of olefinically unsaturated monomers, aqueous polyvinyl acetate dispersions, aqueous polyurethane dispersions, aqueous polyester dispersions, 2-pack paints and especially ready-to-use preparations of the type already mentioned above based on such dispersions.

In the case of the use of the preparations according to the invention for thickening emulsion paints, this often leads to improved flow in these systems and to an improved surface finish of the films produced from these emulsion paints. Another advantage of the preparations according to the invention is based on the fact that their use in pigmented or filled emulsion paints often leads to an improved wettability of these solids, as a result of which the dispersion process, i.e. the production of the ready-to-use emulsion paints, is facilitated. Paint films produced using emulsion paints thickened according to the invention are also distinguished by improved gloss.

The invention is further illustrated but is not intended to be limited by the following examples in which all parts and percentagews are by weight unless otherwise specified.

EXAMPLES

Production of the Powdered Thickener Formulations

Example 1

30 g of pyrogenic silica (Sipernat 50S) were stirred in a plastic beaker with 90 g of a pre-diluted thickener solution (2 parts Borchigel L 76 (Borchers GmbH, Monheim, Germany)—a polyurethane thickener obtainable according to U.S. Pat. No. 5,936,019, example 4, hereby incorporated by reference—/1 part water) using a wooden stick and then mixed evenly in a laboratory mill. This mixture was dried in a vacuum drying oven at 70° C. to constant weight.

Example 2

333.3 g of Borchigen 630 (Borchers GmbH, Monheim, Germany)—D,L-Aspartic acid, N-(1,2-dicarboxyethyl)-, tetrasodium salt, CAS-No. 144538-83-0—, were mixed with 100 g of Borchigel L 76 and this mixture was reduced in a rotary evaporator (70° C.) until being viscous. More water was removed on an aluminium dish in a vacuum drying oven (70° C.) until the product was hard and no longer sticky. This was then comminuted in a laboratory mill and the granules further dried to constant weight.

Example 3

50 g of PU thickener according to EP-B 0 639 595 (U.S. Pat. No. 5,594,087) and 50 g of urea were carefully heated to 130° C. in a 500 ml beaker until a homogeneous melt was formed (approx. 15–20 minutes). It was ensured that the temperature did not rise above 133° C. during this process, in order to prevent or minimize the separation of ammonia from the urea. The melt was then left to cool for 1–2 hours, during which time it solidified.

After solidifying, this melt was ground to a fine-particle powder in an analytical mill (type IKA M 20). It was ensured during this process that the material being ground was not heated too strongly (<50° C.) as a result of the shear stress. Finally, the product obtained was freed from any coarse portions present by sieving using a fine-mesh sieve (mesh size 1 mm). The product was obtained as a fine, white powder having a melting point of 132–133° C.

Powdered active thickener substances can also be produced by the same principle as described above on water-soluble substances that are solid at RT, having a proportion by weight of e.g. 25% or 65% of solid polyurethane active thickener substance.

Example 4

25 g of PU thickener according to EP-B 0 639 595 were dissolved in 50 g of acetone with gentle heating (approx. 40° C.) in a 250 ml beaker. 75 g of cellulose ether were added to this solution so that a pulpy mass was formed. This was transferred into an evaporating dish and dried for approx. 30 minutes in a vacuum drying oven (100 mbar/60° C.). The resulting solid was converted to a light beige, granular material, which softened at approx 65° C., by grinding in a mortar. Various types of cellulose ethers with different molecular weights could be used here.

Example 5

35 g of PU thickener according to EP-B 639 595 (U.S. Pat. No. 5,594,087) and 65 g of urea were suspended in 200 ml of ethanol in a 1-liter three-necked flask with a KPG stirrer and a distillation bridge attached at the side. This mixture was subjected to distillation under normal pressure, the initial suspension changing into a true solution just before the boiling point at approx. 80° C. After the ethanol had distilled off completely, a white, brittle solid was obtained, which was ground using a mortar. The solid obtained was freed from any coarse portions present using a fine-mesh sieve (mesh size 1 mm). The product was a fine, white powder, which softened at a temperature of about 120° C.

Example 6

35 g of PU thickener according to EP-B 0 639 595 (U.S. Pat. No. 5,594,087) and 65 g of urea were suspended in 50 g of water in a 250 ml beaker. A whitish, cloudy, liquid mixture was obtained, which was transferred into a 1-liter one-neck flask and distributed as evenly as possible on the available internal surface. The mixture in the flask was frozen in a temperature-control vessel using a dry ice/acetone mixture. A high vacuum (<0.5 mbar) was applied to the vessel being cooled in this way and the water contained in the mixture was removed by sublimation. After complete removal of the water, a white, brittle solid with a 35% PU proportion was obtained, which was ground using a mortar. The solid obtained was freed from any coarse portions present using a fine-mesh sieve (mesh size 1 mm). The product was obtained as a fine, white powder, which softened at a temperature from 120° C.

Example 7

Work was performed as described in example 2, but a Borchigen 630: Borchigel L 76 ratio of 1:1 (w/w, based on solid) was used.

Example 8

Work was performed as described in example 2, but a Borchigen 630: Borchigel L 76-ratio of 3:1 (w/w, based on solid) was used.

Example 9

Work was performed as described in example 1, but instead of pyrogenic silica, 100 g of calcium carbonate (Omyacarb Extra CL) and 16.5 g of polyurethane thickener according to EP-B 0 639 595 (U.S. Pat. No. 5,594,087), 2.83 g of emulsifier WN (Bayer AG), 5.67 g of Levalin FD (Bayer AG) and 25 g of water were used.

Example 10

Work was performed as described in example 1, but instead of pyrogenic silica, 100 g of calcium carbonate (Omyacarb Extra CL) and 18.75 g of polyurethane thickener according to EP-B 0 639 595 (U.S. Pat. No. 5,594,087), 2.08 g of emulsifier WN (Bayer AG), 4.17 g of Levalin FD (Bayer AG) and 25 g of water were used.

Example 11

Work was performed as described in example 1, but instead of pyrogenic silica, 50 g of Finntalk M03 and 75 g of Borchigel L 76 polyurethane thickener were used.

It is recommended that, after pre-mixing the two products, this mixture should first be pre-dried in a drying oven at 80° C. and only then comminuted.

Example 12

Work was performed as described in example 1, but instead of pyrogenic silica, 100 g of blanc fixe micro and 50 g of Borchigel L 76 polyurethane thickener were used.

Example 13

Work was performed as described in example 1, but instead of pyrogenic silica, 100 g of Calcigloss GU and 50 g of Borchigel L 75 N (a polyurethane thickener of U.S. Pat. No. 5,378,756, example 6, obtainable according to U.S. Pat. No. 5,378,756 example 4, hereby incorporated by reference) were used.

Example 14

Work was performed as described in example 2, but instead of Borchigen 630, 500 g of Borchigen NA 20 (an aqueous solution of an acrylic polymer on the basis of ammonium acrylate) and 133 g of Borchigel L 76 polyurethane thickener were used.

Application-Oriented Testing of the Thickener Formulations According to the Invention Production of the Paint In a 1000 ml bottle with 100 g of glass beads (3 mm diameter), the following components were dispersed for 30 min. in a Skandex:

| | |
|---|---|
| A. AMP (aminomethylpropanol) | 1.25 g |
| Borchigen ND (25% in $H_2O$) | 6.8 g |
| Neocryl AP 2860 defoamer (20%) | 1.6 g |
| $TiO_2$ RHD-2 (Tioxide) | 112.5 g |
| Methoxybutanol | 8.5 g |
| Propylene glycol | 8.5 g |
| Butyl diglycol | 8.5 g |
| $H_2O$ | 22.35 g |
| B. After adding | |
| $H_2O$ | 50.0 g |
| Neocryl XK 62 (42%) | 270.0 g |

Dispersing was then continued for a further 30 min. The paint was freed from the glass beads and investigated further after a maturing period of approx. 12 hours.

The thickener formulation according to the invention could be metered into the mixture A or added to the finished paint while stirring. In the latter case, stirring was continued for 15 min. at 1600 rpm with a standard stirrer.

The rate of partial solution (ease of stirring in the thickener preparations according to the invention) was visually evaluated on a scale of 1 (very good) to 5 (very poor). The viscosity of the paint was measured using a Haake VT 550, SV DIN measuring device at 10.3 $s^{-1}$ or with the Rheostress RS1 (plate/plate geometry) at 10000 $s^{-1}$.

Application-oriented tests with the thickener preparations according to the invention in the above paint are listed in table 1. They show the excellent properties of the novel preparations in the thickening of aqueous systems.

TABLE 1

| Thickener preparation from example | Amount added [g] (*) | Ease of stirring in | Viscosity at D = 10.3 $s^{-1}$ [mPa · s] |
|---|---|---|---|
| 1 | 2.0 | 2 | 15600 |
| 2 | 3.0 | 2–3 | 13300 |
| 3 | 1.0 | 2 | 14500 |
| 4 | 1.0 | 2–3 | 16800 |
| 5 | 1.0 | 1–2 | 15000 |
| 6 | 1.0 | 1–2 | 14800 |
| 7 | 2.0 | 3–4 | 12350 |
| 8 | 4.0 | 1–2 | 16650 |
| 9 | 3.76 | 2 | 10200 |
| 10 | 3.33 | 3 | 12800 |
| 11 | 2.33 | 3 | 11000 |
| 12 | 5.0 | 2 | 16750 |
| 13 | 5.0 | 1–2 | 8950 |
| 14 | 1.5 | 1 | 6950 |

| Comparative examples | | Amount added [g] (*) | Ease of stirring in | Visc (D = 10.3 $s^{-1}$) [mPa · s] |
|---|---|---|---|---|
| 1 | Borchigel L 76 (liquid) | 2.0 | 2 | 15000 |
| 2 | Coatex BR 910 (solid) | 0.5 | 5 (agglomerates) | 5500 |

(*) based on 100 g lacquer (component A + B)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A powdered thickener preparation produced by forming a solution, suspension or melt of a mixture comprising
    a) at least one urethane group-containing, water-soluble or water-dispersible thickener,
    b) at least one water-soluble substance solid at room temperature
    c) optionally a non-ionic, aromatic or aliphatic emulsifier and
    d) optionally other auxiliary substances and subsequently converting the products obtained into powder form by drying or grinding.

2. The thickener preparation of claim 1 wherein component (b) is a water-insoluble substance with an average particle size of <20 μm.

3. The thickener preparation of claim 1 wherein component (b) comprises cellulose, sugar or a water-soluble carbohydrate.

4. The thickener preparation of claim 1 wherein component (b) comprises a water-soluble (co)polymer salt of acrylic, methacrylic or aspartic acid.

5. The thickener preparation of claim 1 wherein component (b) comprises urea.

6. A process for adjusting the rheological properties of aqueous systems by adding the thickener preparation of claim 1 to the aqueous system.

7. A composition of matter containing the thickener preparation of claim 1.

8. The composition of matter of claim 7, wherein the composition is an aqueous automotive and industrial lacquer, a stucco- or other paint, a printing ink or a textile dye, a pigment printing paste, an aqueous pharmaceutical and cosmetic formulation, a plant protection formulation, a filler or a pigment dispersion, a preparation of a detergent, adhesive, wax or polish or a preparation for petroleum extraction.

* * * * *